(12) United States Patent
Adams et al.

(10) Patent No.: US 7,792,290 B2
(45) Date of Patent: *Sep. 7, 2010

(54) GATHERING RANDOMNESS IN A WIRELESS SMART CARD READER

(75) Inventors: Neil Adams, Waterloo (CA); Michael S. Brown, Waterloo (CA); Herb Little, Waterloo (CA); Michael McCallum, Kitchener (CA); Michael K. Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,576

(22) Filed: Jul. 3, 2009

(65) Prior Publication Data

US 2009/0266883 A1   Oct. 29, 2009

Related U.S. Application Data

(63) Continuation of application No. 11/106,633, filed on Apr. 15, 2005, now Pat. No. 7,558,387.

(51) Int. Cl.
*H04L 9/00* (2006.01)
*H04L 9/32* (2006.01)

(52) U.S. Cl. ............................. 380/44; 380/46; 713/189; 713/192; 713/193

(58) Field of Classification Search .................. 380/44, 380/46, 270, 277; 713/168–172, 189–194; 726/20; 708/250, 255, 270
See application file for complete search history.

(56) References Cited

U.S. PATENT DOCUMENTS

| 5,778,071 | A | * | 7/1998 | Caputo et al. ............... 713/159 |
| 5,943,423 | A | | 8/1999 | Muftic |
| 6,628,786 | B1 | | 9/2003 | Dole |
| 6,845,367 | B2 | | 1/2005 | Bendel et al. |
| 7,558,387 | B2 | * | 7/2009 | Adams et al. ................. 380/44 |
| 2002/0080965 | A1 | | 6/2002 | Marinet et al. |
| 2003/0183691 | A1 | | 10/2003 | Lahteenmaki et al. |
| 2004/0109567 | A1 | | 6/2004 | Yang et al. |
| 2004/0188519 | A1 | | 9/2004 | Cassone |
| 2006/0236117 | A1 | | 10/2006 | Lazaridis et al. |

OTHER PUBLICATIONS

Preuss, Norbert, Extended European Search Report for EP 06117313.4, May 31, 2007.

(Continued)

*Primary Examiner*—Hosuk Song
(74) *Attorney, Agent, or Firm*—Integral Intellectual Property Inc.; Miriam Paton

(57) ABSTRACT

A device coupled to a smart card reader may request random data from a smart card inserted into the smart card reader, and the smart card reader may incorporate the random data into its randomness pool. A device having a source of random data may have a driver installed thereon for the smart card reader. The device may generate a random session key to encrypt traffic between the device and the smart card reader. The device may send an encrypted version of the random session key to the smart card reader. The smart card reader may decrypt the encrypted version and incorporate the random session key into its randomness pool. A smart card reader may incorporate random data received from a smart card inserted therein into its randomness pool.

17 Claims, 2 Drawing Sheets

OTHER PUBLICATIONS

Ruiz, Sanchez J., Extended European Search Report for EP 05103029.4, Oct. 6, 2005.
Ruiz, Sanchez J., Examination Report for EP 05103029.4, Jul. 16, 2007.
Wang, Tao, First Office Action w/ translation for CN 2006100740571, Jun. 1, 2007.
Wang, Tao, Second Office Action w/ translation for CN 2006100740571, May 23, 2008.
Engel, Lawrence J., First Office Action for CA 2,541,277, Dec. 3, 2009.
Wang, Yan, Third Office Action for CN 200610074057.1, Jul. 31, 2009.

* cited by examiner

GATHERING RANDOMNESS IN A WIRELESS SMART CARD READER

CROSS-REFERENCE TO RELATED APPLICATIONS

This application is a continuation of U.S. patent application Ser. No. 11/106,633 filed Apr. 15, 2005, entitled "Gathering Randomness in a Wireless Smart Card Reader", which will issue as U.S. Pat. No. 7,558,387 on Jul. 7, 2009, and which is incorporated by reference in its entirety.

BACKGROUND OF THE INVENTION

In general, wireless communication is insecure and vulnerable to attacks. Various techniques may be employed to secure a wireless communication link or to make it less vulnerable to attacks. For example, cryptographic techniques may be employed to secure a wireless communication link. The strength of an encrypted communication link depends on the quality of the cryptographic keys, which in turn, depends, at least in part, on the randomness of the keys. It is known to have a device maintain a randomness pool, i.e. a "pool" of random data, from which the device can extract random data. The extracted random data may be used in the generation of cryptographic keys.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
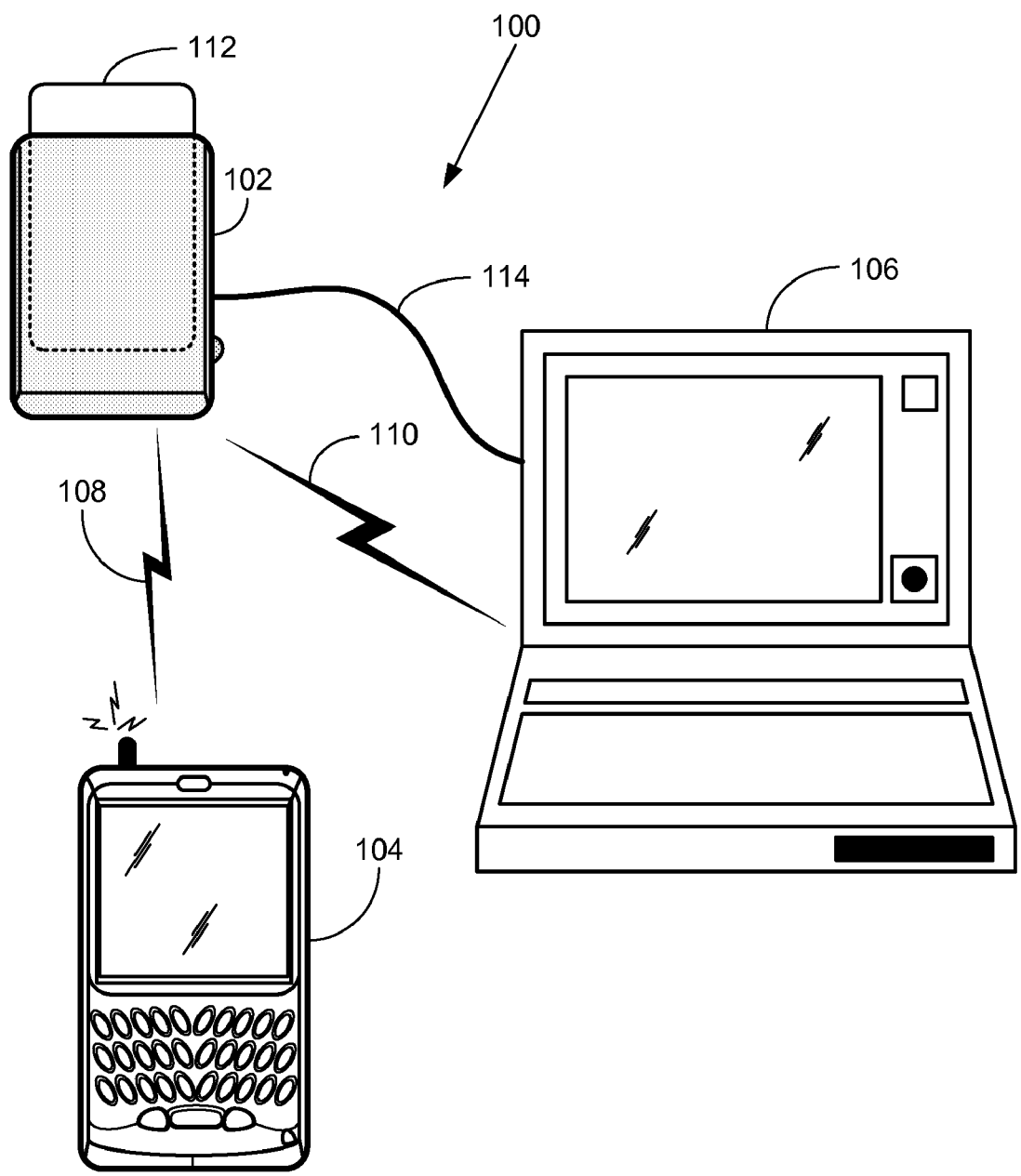
FIG. 1 is a schematic diagram of an exemplary system.

Reference is made to FIG. 1, which is a schematic diagram of an exemplary system, according to some embodiments of the invention. A system 100 includes a wireless smart card reader 102, a mobile device 104 and a wireless-enabled personal computer 106. Smart card reader 102 and mobile device 104 are able to communicate over a wireless communication link 108. Smart card reader 102 and personal computer 106 are able to communicate over a wireless communication link 110. A non-exhaustive list of examples of wireless local area network standards for wireless communication links 108 and 110 includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

A smart card 112 is shown inserted into smart card reader 102. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 112 may use smart card reader 102 for identification, to unlock mobile device 104 and/or personal computer 106, and to digitally sign and/or decrypt messages sent by mobile device 104 and/or personal computer 106. Smart card 112 may also include a random number generator.

For example, mobile device 104 may be able to send and receive e-mail messages via an e-mail server (not shown). If, for example, the Secure Multipurpose Internet Mail Extensions (S/MIME) protocol is used, e-mail messages received at mobile device 104 are encrypted using a symmetric algorithm with a random message key generated by the sender of the e-mail message. The e-mail message also includes the message key, encrypted using the public key of the recipient. Upon receipt of an encrypted e-mail message, mobile device 104 may extract the encrypted message key and send it to smart card reader 102 via communication link 108. Smart card reader 102 may send the encrypted message key to smart card 112, and the decryption engine of smart card 112 may decrypt the encrypted message key using the recipient's private decryption key, which is stored in smart card 112. Smart card reader 102 may retrieve the decrypted message key from smart card 112 and forward it to mobile device 104 via communication link 108 so that mobile device 104 can decrypt the received e-mail message. The smart card 112 may prevent unauthorized use of the recipient's private decryption key by requiring that a password or personal identification number (PIN) be supplied before allowing the decryption operation to proceed.

Similarly, to add a digital signature to an e-mail message being sent by mobile device 104, mobile device 104 may send a hash of the contents of the e-mail message to smart card reader 102 over communication link 108. Smart card reader 102 may pass the hash to smart card 112, which may produce a digital signature from the hash and the sender's private signing key, which is stored in smart card 112. Smart card 112 may then pass the digital signature to smart card reader 102, which may forward it to mobile device 104 via communication link 108 so that mobile device 104 can transmit it along with the e-mail message to the e-mail server. Again, smart card 112 may prevent unauthorized use of the recipient's private signing key by requiring that a password or PIN be supplied before allowing the signing operation to proceed.

The unencrypted message key should be sent securely over communication link 108 from smart card reader 102 to mobile device 104 to prevent a third party from retrieving the message key from communication link 108. Similarly, the hash to be signed should be sent authentically over communication link 108 from smart card reader 102 to mobile device 104 to prevent a third party from modifying the hash and thereby causing smart card 112 to produce a signature using a hash different from the hash of the intended message. Therefore communication link 108 may need to be secured using cryptographic techniques.

The person whose security information is stored on smart card 112 may wish to digitally sign outgoing e-mail sent from personal computer 106 or to decrypt incoming encrypted e-mail received at personal computer 106. This will require personal computer 106 to communicate with smart card reader 102 in much the same way as mobile device 104 communicates with smart card reader 102 as described above. For this purpose, or for other security-related measures (e.g. to permit the person to use personal computer 106), communication link 110 may need to be secured using cryptographic techniques.

To secure communication links 108 and 110, smart card reader 102 may need to generate various cryptographic keys. For example, if communication links 108 and 110 are Bluetooth® communication links, then a relatively short (up to 16-digits) key may be used for the Bluetooth® pairing procedure. An additional layer of security for communication links 108 and 110 may involve encryption with one or more additional keys. These additional keys may be generated from a shared secret between smart card reader 102 and mobile device 104, or smart card reader 102 and personal computer 106, and one or more symmetric keys based on this shared secret may be generated using known Diffie-Hellman and simple password exponential key exchange (SPEKE) methods and variants thereof. Moreover, random session keys may be generated for each individual communication session over communication link 108 or 110.

The strength of the encrypted channels between smart card reader 102 and mobile device 104 and personal computer 106 may depend, at least in part, on the quality of the encryption keys. The more random the data used to generate these keys, the less likely that an attacker will be able to figure out the keys, and the more secure the communication link.

Smart card reader 102 may therefore maintain a "randomness pool", also known as a "random pool" or an "entropy pool". A randomness pool is a "pool" of random data, which is "stirred" as input is incorporated into the pool, to ensure that there is no discernible pattern. Many different implementations of randomness pools and corresponding pseudo-random number generators are known.

For example, smart card reader 102 may store a 256-byte (2048-bit) long array, which is a list of all numbers from 0 to 255. A function may be used to permute the list based on input. A non-exhaustive list of examples for the function includes techniques of the RC4™ encryption algorithm (also known as ARCFOUR), hashing functions and the like. In another example, smart card reader 102 may implement a pseudo-random number generator based on the Yarrow pseudo-random number generator described in J. Kelsey, B. Schneier and N. Ferguson, "Yarrow-160: Notes on the Design and Analysis of the Yarrow Cryptographic Pseudorandom Number Generator", *Sixth Annual Workshop on Selected Areas in Cryptography* (Springer Verlag, August 1999).

The following is a non-exhaustive list of examples for methods to gather randomness for smart card reader 102. Any of these methods, or any combination of these methods, may be used.

(1) Randomness injected at manufacturing. A source of randomness at the manufacturing facility may be used to generate a random value to add to the randomness pool of smart card reader 102. For example, the source of randomness may be a pseudo-random number generator. Although an attacker may know the algorithm used by the pseudo-random number generator, the attacker does not know which value was used to seed the pseudo-random number generator and is unaware of the conditions and circumstances at the time the random value was added to the randomness pool of smart card reader 102.

(2) Random data injected to the smart card reader via an out-of-band communication link. Smart card reader 102 may include a connector, for example, a connector that accepts a USB cable. Smart card reader 102 may be connectable to personal computer 106 using a USB cable 114, for example, in order to charge a battery of smart card reader 102 and/or to upload software to smart card reader 102. The USB cable is an example of an out-of-band communication link, since it is authentic and secure and not vulnerable to attackers attempting to attack communication link 110. Personal computer 106 may include a randomness pool and may be able to provide smart card reader 102 with random data via the out-of-band communication link, and smart card reader 102 may then incorporate the random data into its randomness pool. Similarly, smart card reader 102 may be connectable to mobile device 104 via an out-of-band communication link, for example, a USB cable. Mobile device 104 may include a randomness pool and may be able to provide smart card reader 102 with random data via the out-of-band communication link, and smart card reader 102 may then incorporate the random data into its randomness pool.

(3) Secure transmission of random data over a wireless communication link to the smart card reader. Mobile device 104 may have a smart card reader driver installed thereon. Mobile device 104 may have a source of random data. The smart card reader driver installed on mobile device 104 may extract random data from the source of random data in mobile device 104, and may send the extracted random data securely to smart card reader 102 over communication link 108. Smart card reader 102 may incorporate the extracted random data received securely over communication link 108 into its own randomness pool. Similarly, personal computer 106 may have a smart card reader driver installed thereon. Personal computer 106 may have a source of random data. The smart card reader driver installed on personal computer 106 may extract random data from the source of random data in personal computer 106, and may send the extracted random data securely to smart card reader 102 over communication link 110. Smart card reader 102 may incorporate the extracted random data received securely over communication link 110 into its own randomness pool. This method may be performed periodically.

(4) Traffic received from the smart card is incorporated into the smart card reader's randomness pool. Smart card reader 102 may incorporate traffic received from smart card 112 into its randomness pool. Although some of the data stored on smart card 112 may not be random (e.g. biometrics, a person's name and other identification), the order in which this data is requested by smart card reader 102 may be unpredictable. Random elements may be included in some of the traffic received from smart card 112 by smart card reader 102, for example, the decrypted message key for an S/MIME e-mail message received at mobile device 102 or personal computer 106, and the digital signature produced by smart card 112 from the hash of the contents of an e-mail message and the e-mail sender's private signing key.

(5) Random data from a random number generator of a smart card inserted in the smart card reader is incorporated into the smart card reader's randomness pool. Smart card 112 may have a random number generator. A device having a driver for smart card reader 102 installed thereon, such as mobile device 104 or personal computer 106, may request random data from smart card 112 via smart card reader 102.

Since this random data is traffic received by smart card reader 102 from smart card 112, then if smart card reader 102 implements method (4) above of incorporating traffic received from smart card 112 in its randomness pool, this random data generated by the random number generator of smart card 112 will be incorporated into the randomness pool of smart card reader 102.

(6) Incorporating into the randomness pool of the smart card reader a random session key generated by another device that is used to encrypt traffic between the device and the smart card reader. Mobile device 104 or personal computer 106 may generate a random session key and use it to encrypt traffic to smart card reader 102 over communication link 108 or 110, respectively. Smart card reader 102 may incorporate the random session key into its randomness pool.

Figure 2:
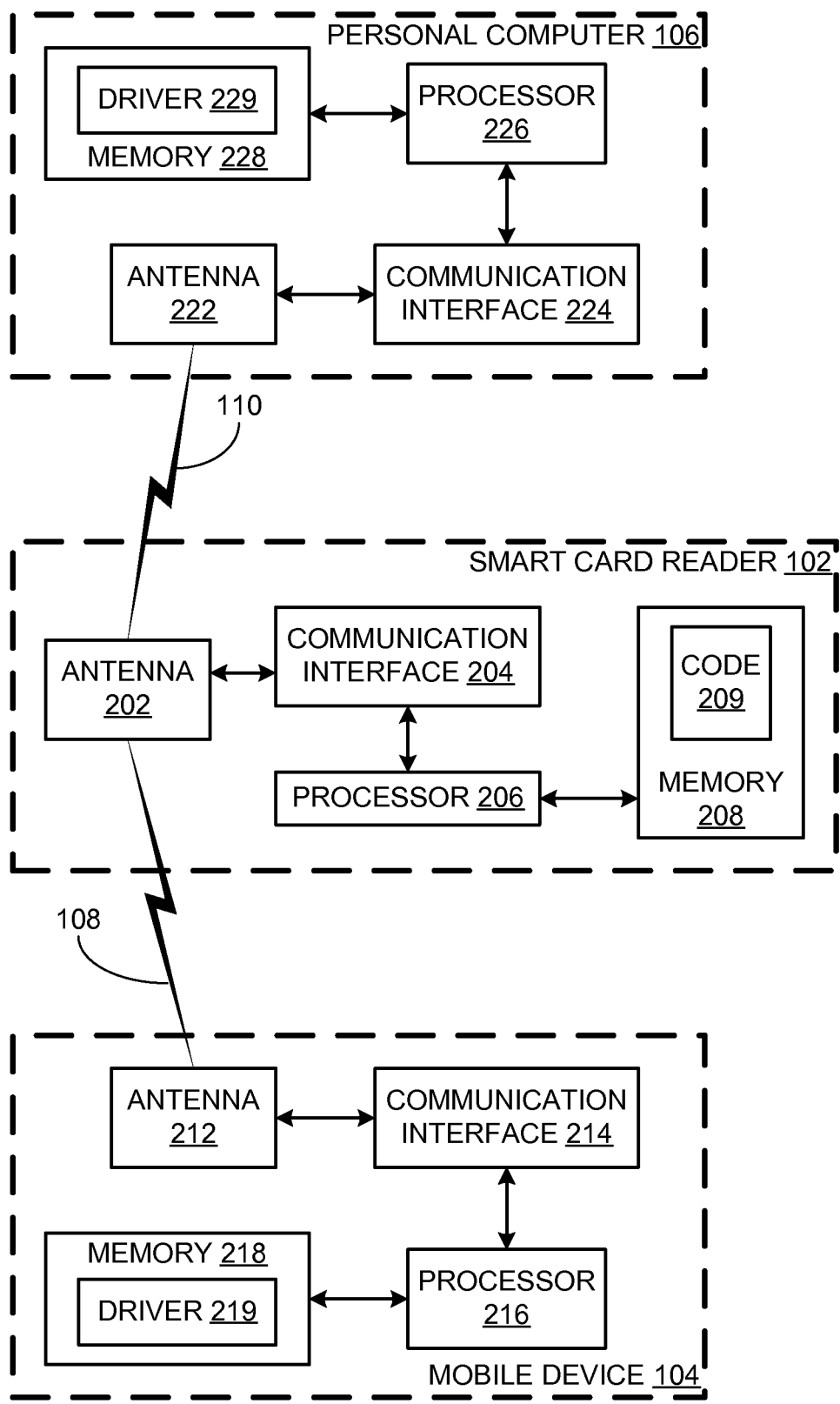
FIG. 2 is a block diagram of the exemplary system of FIG. 1.

FIG. 2 is a block diagram of system 100, according to some embodiments of the invention. For clarity, some components of smart card reader 102, mobile device 104, and personal computer 106 are not shown in FIG. 2 and are not described explicitly below.

Smart card reader 102, mobile device 104 and personal computer 106 include antennae 202, 212, and 222, respectively. A non-exhaustive list of examples for antennae 202, 212 and 222 includes dipole antennae, monopole antennae, multilayer ceramic antennae, planar inverted-F antennae, loop antennae, shot antennae, dual antennae, omnidirectional antennae and any other suitable antenna.

Smart card reader 102, mobile device 104 and personal computer 106 include communication interfaces 204, 214, and 224, respectively, which are coupled to antennae 202, 212, and 222, respectively. A non-exhaustive list of examples for standards with which communication interfaces 204, 214 and 224 may be compatible includes 802.11a, b, g and n and future related standards, the Bluetooth® standard, the Zigbee™ standard and the like.

Smart card reader 102 also includes a processor 206 coupled to communication interface 204, and a memory 208, which may be fixed in or removable from smart card reader 102. Memory 208 may be coupled to processor 206 or partly embedded in processor 206. Communication interface 204 and processor 206 may be part of the same integrated circuit or in separate integrated circuits. Similarly, processor 206 and memory 208 may be part of the same integrated circuit or in separate integrated circuits.

Mobile device 104 also includes a processor 216 coupled to communication interface 214, and a memory 218, which may be fixed in or removable from mobile device 104. Memory 218 may be coupled to processor 216 or partly embedded in processor 216. Communication interface 214 and processor 216 may be part of the same integrated circuit or in separate integrated circuits. Similarly, processor 216 and memory 218 may be part of the same integrated circuit or in separate integrated circuits.

Personal computer 106 also includes a processor 226 coupled to communication interface 224, and a memory 228, which may be fixed in or removable from personal computer 106. Memory 228 may be coupled to processor 226 or partly embedded in processor 226. Communication interface 224 and processor 226 may be part of the same integrated circuit or in separate integrated circuits. Similarly, processor 226 and memory 228 may be part of the same integrated circuit or in separate integrated circuits.

A non-exhaustive list of examples for processors 206, 216 and 226 includes a central processing unit (CPU), a digital signal processor (DSP), a reduced instruction set computer (RISC), a complex instruction set computer (CISC) and the like. Furthermore, processors 206, 216 and 226 may be part of an application specific integrated circuit (ASIC) or may be a part of an application specific standard product (ASSP).

A non-exhaustive list of examples for memories 206, 216 and 226 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Memories 218 and 228 may store respective drivers 219 and 229 for smart card reader 102. Drivers 219 and 229 may implement portions of the methods described hereinabove.

Memory 208 may store executable code 209 which, when executed by processor 206, may cause smart card reader 102 to incorporate data into its randomness pool. Executable code 209 may implement portions of the methods described hereinabove.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A smart card reader comprising:
   a randomness pool;
   a processor; and
   a memory to store executable code which, when executed by said processor, incorporates traffic received from a smart card operatively coupled to said smart card reader into said randomness pool,
   wherein said smart card has a random number generator and said traffic includes random data generated by said random number generator.

2. The smart card reader of claim 1, wherein said smart card reader is able to generate one or more cryptographic keys using random data extracted from said randomness pool.

3. The smart card reader of claim 1, wherein an implementation of said randomness pool includes a list and wherein said executable code, when executed by said processor, incorporates said traffic into said randomness pool by permuting said list according to a function of at least said traffic.

4. The smart card reader of claim 1, wherein said traffic received from said smart card is to be forwarded by said smart card reader to a device that is coupled to said smart card reader.

5. The smart card reader of claim 4, further comprising:
   a wireless communication interface coupled to said processor,
   wherein said traffic is to be forwarded by said smart card reader to said device over a wireless communication link via said wireless communication interface.

6. The smart card reader of claim 5, wherein said wireless communication link comprises a Bluetooth communication link.

7. The smart card reader of claim 1, wherein said random data is requested by said device.

8. A system comprising:
   a smart card reader having a randomness pool; and a device having installed thereon a driver for said smart card reader and arranged to generate a random session key used to encrypt traffic between said device and said smart card reader, wherein said smart card reader is to receive from said device an encrypted version of said random session key, and wherein said smart card reader is to decrypt said encrypted version and to incorporate said random session key into said randomness pool.

9. The system of claim 8, wherein an implementation of said randomness pool in said smart card reader includes a list and wherein said smart card reader is to incorporate said random session key into said randomness pool by permuting said list according to a function of at least said random session key.

10. The system of claim 8, wherein said traffic is to be sent encrypted with said random session key over a wireless communication link between said device and said smart card reader.

11. The system of claim 10, wherein said wireless communication link comprises a Bluetooth communication link.

12. The system of claim 8, wherein said device comprises a mobile device.

13. The system of claim 8, wherein said device comprises a personal computer.

14. A method for gathering randomness in a smart card reader, the method comprising:

receiving an encrypted version of a random session key from a device having installed thereon a driver for said smart card reader, wherein said random session key was generated by said device and wherein said random session key is to encrypt traffic between said device and said smart card reader;

decrypting said encrypted version; and incorporating said random session key into a randomness pool of said smart card reader.

15. The method of claim 14, wherein an implementation of said randomness pool includes a list and wherein incorporating said random session key into said randomness pool includes permuting said list according to a function of at least said random session key.

16. The method of claim 14, wherein receiving said encrypted version comprises receiving said encrypted version over a wireless communication link between said device and said smart card reader.

17. The method of claim 16, wherein said wireless communication link comprises a Bluetooth communication link.

* * * * *